US008891855B2

(12) United States Patent
Miyashita et al.

(10) Patent No.: US 8,891,855 B2
(45) Date of Patent: Nov. 18, 2014

(54) INFORMATION PROCESSING APPARATUS, INFORMATION PROCESSING METHOD, AND PROGRAM FOR GENERATING AN IMAGE INCLUDING VIRTUAL INFORMATION WHOSE SIZE HAS BEEN ADJUSTED

(75) Inventors: Akira Miyashita, Kanagawa (JP); Kazuhiro Suzuki, Tokyo (JP); Hiroyuki Ishige, Tokyo (JP)

(73) Assignee: Sony Corporation, Tokyo (JP)

( * ) Notice: Subject to any disclaimer, the term of this patent is extended or adjusted under 35 U.S.C. 154(b) by 274 days.

(21) Appl. No.: 13/510,313

(22) PCT Filed: Oct. 28, 2010

(86) PCT No.: PCT/JP2010/069153
§ 371 (c)(1),
(2), (4) Date: May 17, 2012

(87) PCT Pub. No.: WO2011/070871
PCT Pub. Date: Jun. 16, 2011

(65) Prior Publication Data
US 2012/0230581 A1    Sep. 13, 2012

(30) Foreign Application Priority Data

Dec. 7, 2009    (JP) ................................. 2009-277850

(51) Int. Cl.
     *G06T 15/00*      (2011.01)

(52) U.S. Cl.
     USPC ........................... 382/154; 382/286; 382/298

(58) Field of Classification Search
None
See application file for complete search history.

(56) References Cited

U.S. PATENT DOCUMENTS

| 2005/0036044 | A1 | 2/2005 | Funakura |
| 2009/0066815 | A1* | 3/2009 | Nozaki et al. ............ 348/231.99 |
| 2010/0220925 | A1* | 9/2010 | Ikeda et al. ................... 382/165 |
| 2012/0257831 | A1* | 10/2012 | Eaton et al. ................... 382/173 |

FOREIGN PATENT DOCUMENTS

| JP | 7 210608 | 8/1995 |
| JP | 2004 239965 | 8/2004 |
| JP | 2005 94741 | 4/2005 |
| JP | 2005 295163 | 10/2005 |
| JP | 2007 256254 | 10/2007 |
| JP | 2008 510254 | 4/2008 |
| JP | 2008 191751 | 8/2008 |
| JP | 2009 88742 | 4/2009 |

OTHER PUBLICATIONS

International Search Report Issued Dec. 14, 2010 in PCT/JP10/069153 Filed Oct. 28, 2010.

\* cited by examiner

*Primary Examiner* — Brian P Werner
(74) *Attorney, Agent, or Firm* — Oblon, Spivak, McClelland, Maier & Neustadt, L.L.P.

(57) ABSTRACT

An information processing apparatus includes an image acquisition unit for acquiring a real-world image, a space analysis unit for analyzing a three-dimensional space structure of the real-world image, a scale reference detection unit for detecting a length, in a three-dimensional space, of an object to be a scale reference that is included in the real-world image, and a scale determination unit for determining, from the length of the object detected by the scale reference detection unit, a scale of the three-dimensional space.

11 Claims, 9 Drawing Sheets

INFORMATION PROCESSING APPARATUS, INFORMATION PROCESSING METHOD, AND PROGRAM FOR GENERATING AN IMAGE INCLUDING VIRTUAL INFORMATION WHOSE SIZE HAS BEEN ADJUSTED

TECHNICAL FIELD

The present invention relates to an information processing apparatus, an information processing method, and a program.

BACKGROUND ART

Recently, as a part of Augmented Reality technology, virtual information is made to be displayed being overlaid on real-world information such as a captured image. For example, a predetermined mark included in a captured image can be read, and virtual information corresponding to the mark can be displayed being overlaid on the real-world image (for example, Patent Literature 1).

CITATION LIST

Patent Literature

Patent Literature 1: JP 2008-510254A

SUMMARY OF INVENTION

Technical Problem

However, with Patent Literature 1, since the scale of the space of the captured real-world image was unknown, there was a problem that it was not possible to display the virtual information while overlaying the same on the real-world image at appropriate dimensions.

Accordingly, the present invention is made in view of the above problem, and the object of the present invention is to provide an information processing apparatus, an information processing method, and a program which are novel and improved, and which are capable of overlaying virtual information of a size suitable for the scale of the 3D space of a real-world image.

Solution to Problem

According to an aspect of the present invention, in order to achieve the above-mentioned object, there is provided an information processing apparatus including an image acquisition unit for acquiring a real-world image, a space analysis unit for analyzing a three-dimensional space structure of the real-world image, a scale reference detection unit for detecting a length, in a three-dimensional space, of an object to be a scale reference that is included in the real-world image, and a scale determination unit for determining, from the length of the object detected by the scale reference detection unit, a scale of the three-dimensional space.

Furthermore, the information processing apparatus may further include a storage unit storing virtual information to be displayed being overlaid on the real-world image and a real size of the virtual information in association with each other, a virtual information arrangement unit for arranging on the real-world image the virtual information whose size has been adjusted according to the scale determined by the scale determination unit, and an image generation unit for generating an output image obtained by overlaying the virtual information on the real-world image.

The object to be a scale reference detected by the scale reference detection unit may be a person.

The object to be a scale reference detected by the scale reference detection unit may be a face.

The scale reference detection unit may preferentially take an object that is clearly captured, among objects included in the real-world image, as the object to be a scale reference.

The scale reference detection unit may preferentially take an object that is located at a distance near an imaging device, among objects included in the real-world image, as the object to be a scale reference.

The scale reference detection unit may preferentially take an object near a horizontal position of an imaging device, among objects included in the real-world image, as the object to be a scale reference.

According to another aspect of the present invention, in order to achieve the above-mentioned object, there is provided an information processing method including the steps of acquiring a real-world image, analyzing a three-dimensional space structure of the real-world image, detecting a length, in a three-dimensional space, of an object to be a scale reference that is included in the real-world image, and determining, from the detected length of the object, a scale of the three-dimensional space.

According to another aspect of the present invention, in order to achieve the above-mentioned object, there is provided a program for causing a computer to function as an information processing apparatus including an image acquisition unit for acquiring a real-world image, a space analysis unit for analyzing a three-dimensional space structure of the real-world image, a scale reference detection unit for detecting a length, in a three-dimensional space, of an object to be a scale reference that is included in the real-world image, and a scale determination unit for determining, from the length of the object detected by the scale reference detection unit, a scale of the three-dimensional space.

Advantageous Effects of Invention

As described above, according to the present invention, it is possible to overlay virtual information of a size suitable for the scale of the 3D space of a real-world image.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Furthermore, the "Description of Embodiments" will be described according to the following order.
(1) Object of Present Embodiment
(2) Overview of Information Processing Apparatus
(3) Hardware Configuration of Information Processing Apparatus
(4) Functional Configuration of Information Processing Apparatus
(5) Details of Operation of Information Processing Apparatus
(1) Object of Present Embodiment First, an object of the present embodiment will be described. Recently, as a part of Augmented Reality technology, virtual information is made to be displayed being overlaid on real-world information such as a captured image. For example, a predetermined mark included in a captured image can be read, and virtual information corresponding to the mark can be displayed being overlaid on the real-world image. However, since the scale of the space of the captured real-world image was unknown, there was a problem that it was not possible to display the virtual information while overlaying the same on the real-world image at appropriate dimensions.

Figure 1:
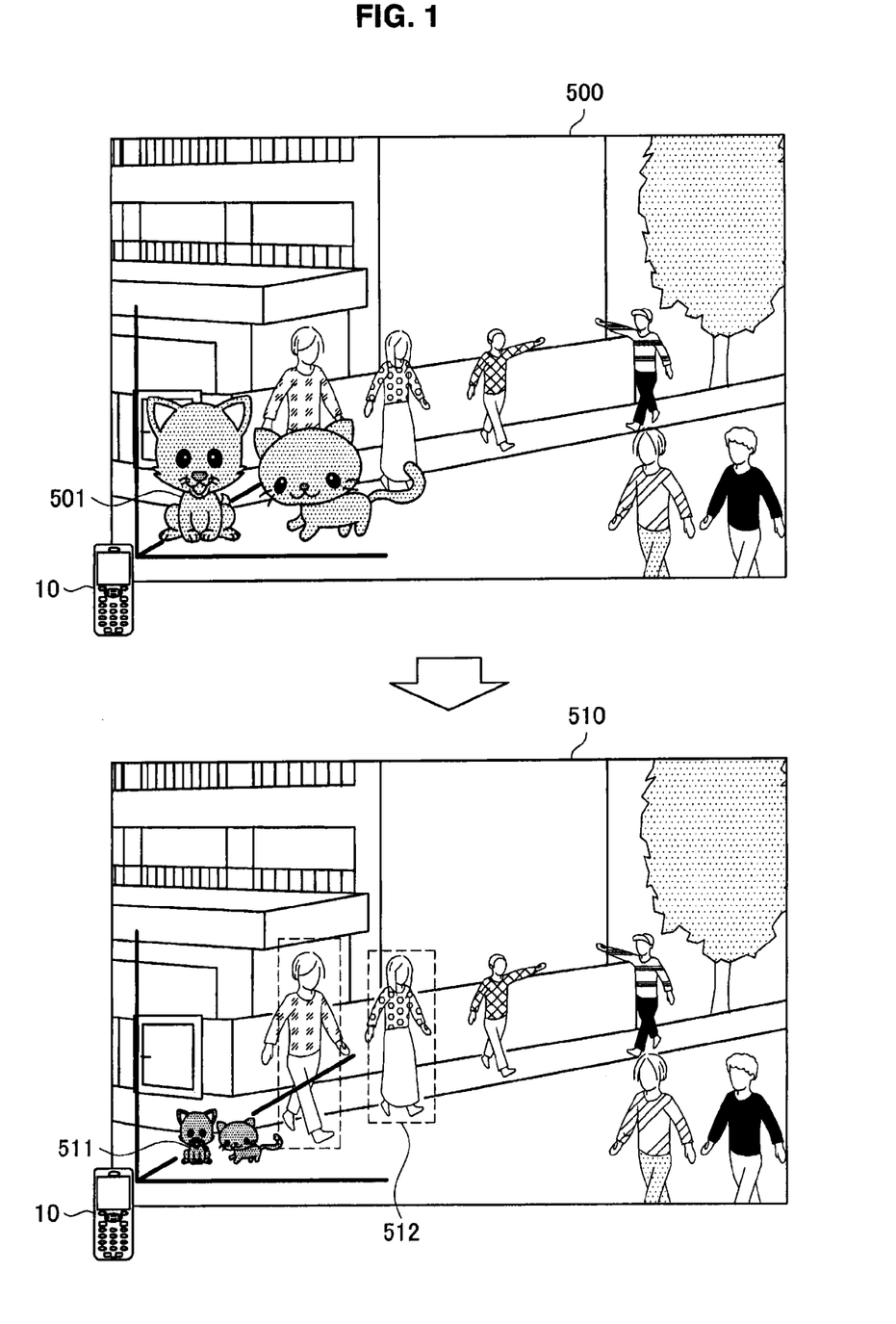
FIG. 1 is an explanatory diagram describing an overview of an information processing apparatus according to an embodiment of the present invention.
Figure 2:
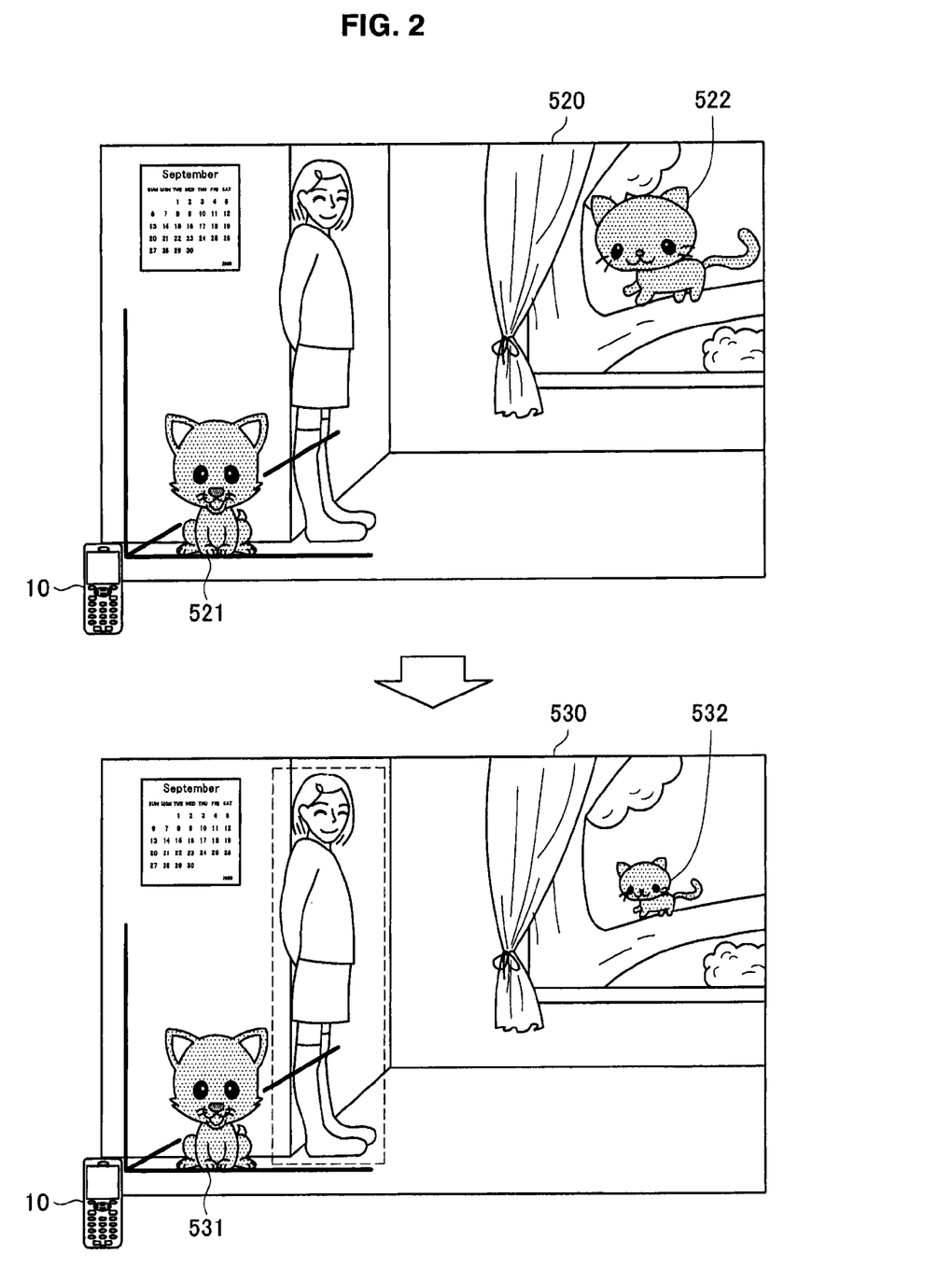
FIG. 2 is an explanatory diagram describing an overview of the information processing apparatus according to the embodiment.

Accordingly, an information processing apparatus 10 according to the embodiment of the present invention has been created in view of the above-described circumstance. According to the information processing apparatus 10 of the present embodiment, it is possible to overlay virtual information of a size suitable for the scale of the 3D space of a real-world image.
(2) Overview of Information Processing Apparatus Next, an overview of the information processing apparatus 10 will be described with reference to FIGS. 1 and 2. FIGS. 1 and 2 are explanatory diagrams describing an overview of the information processing apparatus 10. The information processing apparatus 10 can be exemplified by an information processing terminal provided with a display device, such as a mobile phone, a PDA (Personal Digital Assistant), a portable game machine, a small PC (Personal Computer), or the like. Virtual information to be overlaid on a real-world image is registered in the information processing apparatus 10.

As shown in FIG. 1, an image 500 is an image that is displayed on a display unit of the information processing apparatus 10. In the image 500, virtual information 501 is displayed being overlaid on a real-world image that is captured by an imaging device provided in the information processing apparatus 10. In the image 500, a cat, a dog, and the like are displayed as the virtual information 501. The size of the virtual information 501 displayed on the image 500 is larger than the people who are the real objects in the real-world image. This is because the virtual information 501 cannot be adjusted to an appropriate size due to the scale of the real-world image, the dimensions of the virtual information in the real-world image, and the like being unknown.

On the other hand, in an image 510, virtual information 511 is overlaid on the real-world image with its size adjusted in accordance with the height of a person 512. The information processing apparatus 10 determines the scale reference of the real-world image based on the height of the person 512, and adjusts the virtual information 511 to be of a size in accordance with the scale reference. For example, when taking the person 512 as the object for scale reference, if the length of the person 512 in the image is 16.5 divisions and the average height of people is 165 cm, the scale of the space will be 10 cm/div.

If the real size of the cat of the virtual information 511 is registered as 50 cm, the size of the cat is known to be 5 divisions according to the space scale calculated by the above method. In this manner, according to the present embodiment, virtual information of a size suitable for the scale of a three-dimensional space of the real-world image can be overlaid and displayed.

Furthermore, as shown in FIG. 2, in an image 520, although the dimensions of virtual information 521 is appropriate in relation to a person, virtual information 522 arranged in the back of the three-dimensional space is not displayed at appropriate dimensions. In the image 520, even though the image on the right is an image having a depth in the three-dimensional space, the size of the virtual information 522 is a size that is not in accordance with the depth of the three-dimensional space.

Figure 3:
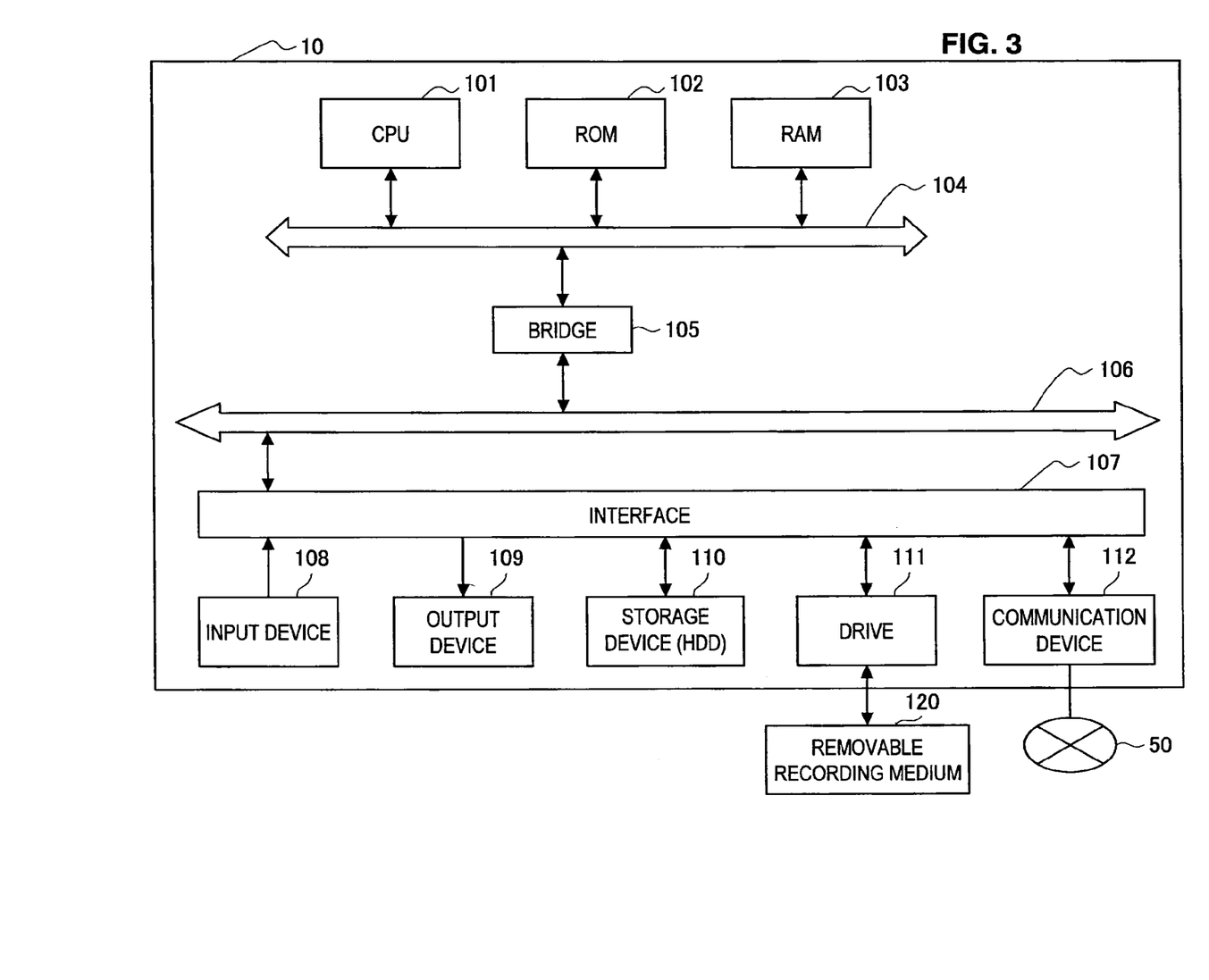
FIG. 3 is a block diagram showing a hardware configuration of the information processing apparatus according to the embodiment.

On the other hand, in an image 530, virtual information 531 is of dimensions that are in accordance with the height of a person 533 in the real-world image, and virtual information 532 is of dimensions that are in accordance with the depth of the three-dimensional space. In this manner, the information processing apparatus 10 is capable of overlaying virtual information of a size that is suitable for the scale of the real-world image, and further, of overlaying virtual information of a size suitable for the depth of the three-dimensional space of the real-world image.
(3) Hardware Configuration of Information Processing Apparatus In the foregoing, the overview of the information processing apparatus 10 has been described. Next, a hardware configuration of the information processing apparatus 10 will be described with reference to FIG. 3. FIG. 3 is a block diagram showing a hardware configuration of the information processing apparatus 10. The information processing apparatus 10 includes CPU (Central Processing Unit) 101, a ROM (Read Only Memory) 102, a RAM (Random Access Memory) 103, a host bus 104, a bridge 105, an external bus 106, an interface 107, an input device 108, an output device 109, a storage device (HDD) 110, a drive 111, and a communication device 112.

The CPU 101 functions as an arithmetic processing unit and a control unit, and controls entire operation of the information processing apparatus 10 according to various program. Also, the CPU 101 may be a microprocessor. The ROM 102 stores a program to be used by the CPU 101, arithmetic parameters, or the like. The RAM 103 temporarily stores a program used in the execution of the CPU 101, parameters arbitrarily changed in the execution, or the like. These are connected to each other by the host bus 104 configured from a CPU bus or the like.

The host bus 104 is connected to the external bus 106 such as a PCI (Peripheral Component Interconnect/Interface) bus via the bridge 105. Additionally, the host bus 104, the bridge 105, and the external bus 106 do not necessarily have to be separately configured, and these functions may be implemented in a single bus.

The input device 108 is configured from input means for a user to input information, such as a mouse, a keyboard, a touch panel, a button, a microphone, a switch, and a lever, an input control circuit for generating an input signal based on input from the user and outputting the same to the CPU 101, and the like. The user of the information processing apparatus 10 can input various data or command a processing operation to the information processing apparatus 10 by operating the input device 108.

The output device 109 is configured, for example, from a display device such as a CRT (Cathode Ray Tube) display device, a liquid crystal display (LCD) device, an OLED (Organic Light Emitting Diode) device or a lamp, and an audio output device such as speakers or headphones. The output device 109 outputs reproduced content, for example. Specifically, the display device displays, as text or image, various information such as video data which has been reproduced. For its part, the audio output device converts audio data or the like which has been reproduced into audio and outputs the same.

The storage device 110 is a device for storing data, configured as an example of the storage unit of the information processing apparatus 10 according to the present embodiment, and may include a storage medium, a recording device that records data in the storage medium, a read-out device that reads data from the storage medium, a deleting device that deletes data recorded in the storage medium, or the like. The storage device 110 is configured from an HDD (Hard Disk Drive), for example. This storage device 110 drives a hard disk, and stores a program to be executed by the CPU 101 or various data. Also, item, identification numbers, and the like described later are stored in this storage device 110.

The drive 111 is a reader/writer for a storage medium, and is built in or externally attached to the information processing apparatus 10. The drive 111 reads information recorded on a removable recording medium 24 attached thereto, such as a magnetic disk, an optical disk, a magneto-optical disk, or a semiconductor memory, and outputs the same to the RAM 103.

The communication device 112 is a communication interface configured from a communication device or the like for connecting to a communication network 50, for example. Furthermore, the communication device 112 may be a wireless LAN (Local Area Network)-compatible communication device, a wireless USB-compatible communication device, or a wired communication device that performs communication by wire.

(4) Functional Configuration of Information Processing Apparatus

Figure 4:
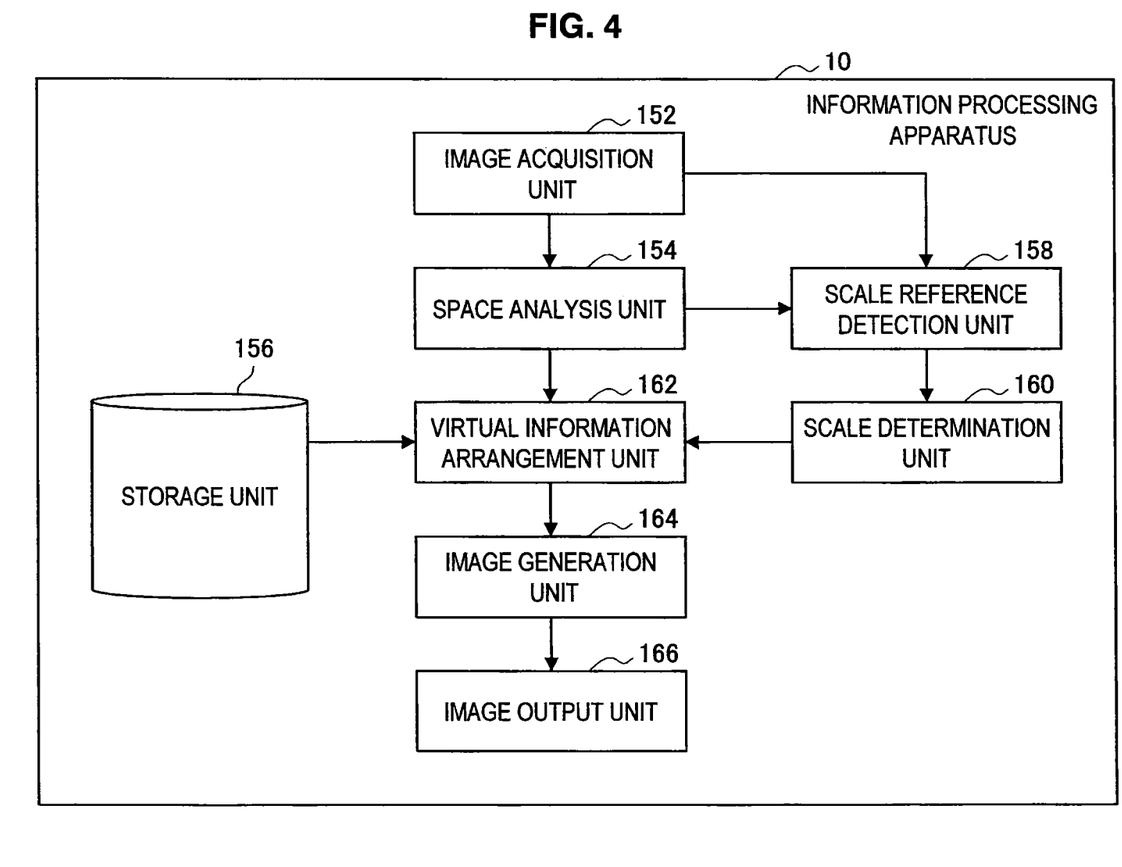
FIG. 4 is a block diagram showing a functional configuration of the information processing apparatus according to the embodiment.

In the foregoing, an example hardware configuration of the information processing apparatus 10 has been described. Next, the functional configuration of the information processing apparatus 10 according to the present embodiment will be described with reference to FIG. 4. FIG. 4 is a block diagram showing the functional configuration of the information processing apparatus 10 according to the present embodiment.

As shown in FIG. 4, the information processing apparatus 10 includes an image acquisition unit 152, a space analysis unit 154, a storage unit 156, a scale reference detection unit 158, a scale determination unit 160, a virtual information arrangement unit 162, an image generation unit 164, an image output unit 166, and the like.

The image acquisition unit 152 has a function of acquiring a real-world image. The real-section image is an image of a scenery captured by an imaging device (not shown), for example. The imaging device may be integrally configured with the information processing apparatus 10, or may be configured as a separate device. For example, an image captured by an imaging device which is separate from the information processing apparatus 10 may be stored in a storage device such as a memory card and may be retrieved by the image acquisition unit 152. The image acquisition unit 152 provides the acquired real-world image to the space analysis unit 154.

The space analysis unit 154 analyses the structure of the real-world image as a three-dimensional space provided by the image acquisition unit 152. As a method of analyzing the three-dimensional structure based on a real-world image, the three-dimensional structure of the real-world image may be analysed by perceiving the shades of the image, or the three-dimensional structure may be analysed based on the configuration of a frame obtained by detecting a frame of a building or the like included in the real-world image.

Figure 5:
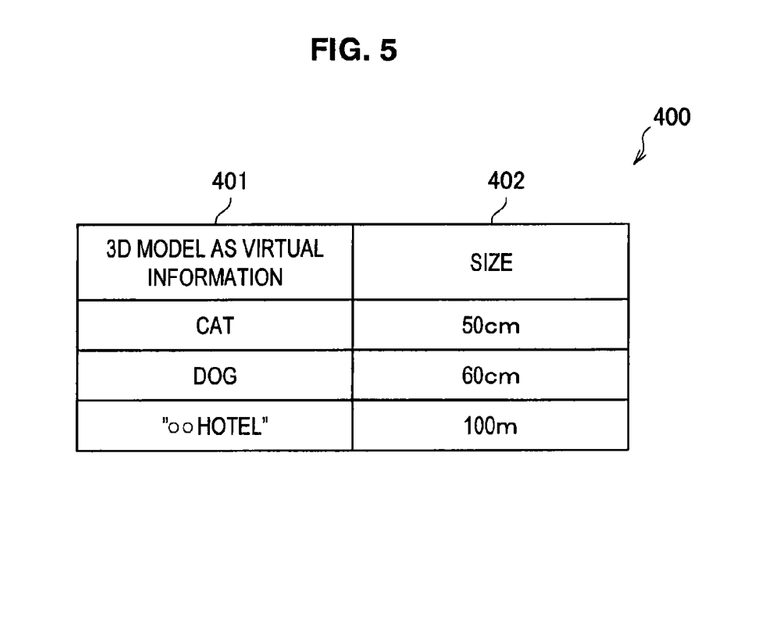
FIG. 5 is an explanatory diagram describing stored contents of a storage unit according to the embodiment.

Virtual information to be overlaid on the real-world image and the actual size of the virtual information are stored in association with each other in the storage unit 156. FIG. 5 is an explanatory diagram describing stored contents 400 of the storage unit 156. As shown in FIG. 5, virtual information 401 and a size 400 of the virtual information are stored in association with each other. The virtual information 401 may include identification information for identifying the virtual information. As the virtual information 401, an image of each piece of virtual information may be stored; alternatively, it is also possible to have only the identification information of the virtual information stored, and an image associated with the identification information of the virtual information may be acquired from another device, such as a server.

As shown in FIG. 5, for example, a 3D model 401 as virtual information "cat" and a size 402 "50 cm," and a 3D model 401 as virtual information "dog" and a size 402 "60 cm" are stored in the storage unit 156 in association with each other. Also, a 3D model as virtual information "—Hotel" and a size 402 "100 m" are stored in association with each other. The 3D model 401 as virtual information and the size 402 may be stored in advance, or the storage contents may be updated or added according to a user input.

Returning to FIG. 4, the scale reference detection unit 158 has a function of detecting the length in the three-dimensional space of an object which is included in the real-world image and which is to be the scale reference. As the object to be the scale reference, included in the real-world image, a person, a face, or the like, whose average length is apparent is cited, for example. Average lengths can be obtained in advance for heights of people, lengths of faces, distances between the eyes, and the like. Also, the length is a length in a three-dimensional space coordinate system, and is the number of divisions or the like, for example.

Figure 6:
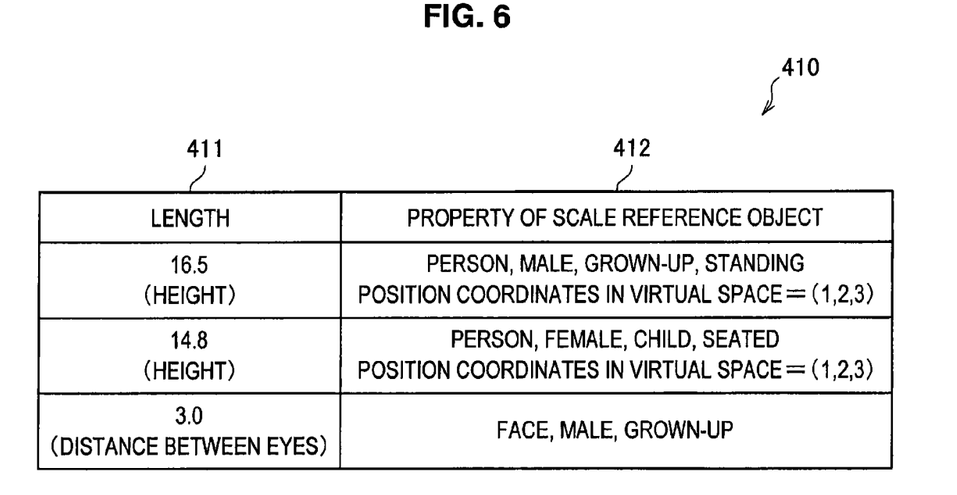
FIG. 6 is an explanatory diagram describing an example of a detection result of a scale reference detection unit according to the embodiment.

An example of a detection result 410 of the scale reference detection unit 158 is shown in FIG. 6. For example, as shown in FIG. 6, the scale reference detection unit 158 detects 16.5 as a length 511 of an object. A property 412 of the detected object is "person, male, grown-up, standing." Also, a coordinate of the object in the virtual space is detected as "(1, 2, 3)." Also, a "seated" state may be detected as the property of a scale reference object, and then the length (height) in the seated state may be detected. Furthermore, a face may be detected as the property of the scale reference object, and then the length of the face (distance between the eyes) may be detected. The height of a person, the length of a face, or the like, included in the real-world image may be detected by using a known technology described in JP 2006-209334A, for example.

In JP 2006-209334A, a person or the like is photographed and a two-dimensional image is acquired, and a person area is extracted from the acquired two-dimensional image and is projected on a plurality of horizontal planes in the three-dimensional space. Then, an integrated value is calculated by performing integration of the image of a person projected on each horizontal plane, and the horizontal position in the three-dimensional space where the peak of the calculated integrated value is located is detected as the position of the person, and also, the height of the highest horizontal plane, among the horizontal positions in the three-dimensional space where this peak is located, where the image of the person is present is detected as the height of the being.

Returning to FIG. 4, explanation on the function of the scale reference detection unit 158 will be continued. In the case there are a plurality of persons or faces in the real-world image, an object which is pictured more clearly, among the plurality of persons or faces, is preferentially taken as the object to be the scale reference, and its length is detected. Also, a person or the like positioned at a short distance from the information processing apparatus 10 may be preferentially taken as the object to be the scale reference, and its length may be detected.

Furthermore, an object near the horizontal position of the information processing apparatus 10 may be taken as the object to be the scale reference, and its length may be detected. Since it is difficult to accurately detect the length of the height, the length of the face or the like for an object located at a place with a great difference in the height direction to the information processing apparatus 10, an object that is near the horizontal position of the information processing apparatus 10 is preferentially selected. Also, a man of a common person's height may be taken as the object to be the scale reference, instead of children whose differences in the height are great.

Also, in the case of a state where a person is seated, that it is a state where the object to be the scale reference is seated is detected, and the length for the seated state (for example, 14.8) is detected. In this manner, the scale reference detection unit 158 detects the property of the object, together with the length of the object, and provides the detection result to the scale determination unit 160.

The scale determination unit 160 has a function of determining, from the length of the object detected by the scale reference detection unit 158, the scale of the three-dimensional space. For example, it is assumed that it is notified by the scale reference detection unit 158 that the object to be the scale reference is a person, and its length is 16.5 divisions. In this case, if the average height of people is set in advance to be 165 cm, the scale of the space can be determined to be 10 cm/div.

Also, as described above, in the case the property of the object is provided by the scale reference detection unit 158 together with the length of the object, the scale of the space can be determined based on the characteristics of the property. That is, in the case where not only the information "person" but also information such as "male, grown-up, standing" is provided as the property of the object, an average real-scale value of a grown-up man who is standing is acquired, and the scale of the space can be more accurately determined.

Also, in the case the lengths of a plurality of objects are provided by the scale reference detection unit 158, the scale of the space can be determined by selecting one arbitrary object from the plurality of objects. Also, in the case the lengths of a plurality of objects are provided by the scale reference detection unit 158, the scale of the space may be calculated by a statistical calculation process by, for example, averaging the values of the lengths or eliminating the outliers using the plurality of objects.

Furthermore, in the case there are a plurality of objects to be the scale reference, classification into groups may be performed according to the property information of the objects, and the actual length of different object which is the scale reference may be applied to each group. For example, classification based on sex or age, the type of person or face, the posture of a person (standing, seated), or the like which is the property of an object is conceivable.

Furthermore, in the case the lengths of all the objects included in the real-world image are detected by the scale reference detection unit 158, an arbitrary object may be excluded from the process of scale determination by the scale determination unit 160 or the scale may be determined by weighting each object.

For example, an object that is far away from the information processing apparatus 10 may be excluded from the scale determination process or may be calculated by a smaller weight than an object that is near the information processing apparatus 10. This is because, as described above, an object that is far away from the information processing apparatus 10 is highly likely to be an unclear image, and when it is used for the scale determination process, the calculation accuracy will be reduced.

Also, an object that is located at a position with a great difference in the height direction from the information processing apparatus 10 may be excluded or may be calculated by a smaller weight than an object that is near the horizontal position of the information processing apparatus 10. This is because, as described above, in the case an object is located at a place with a great difference in the height direction from the information processing apparatus 10, accurate detection of the height is difficult.

The virtual information arrangement unit 162 has a function of arranging, in the real-world image, virtual information whose size has been adjusted according to the scale determined by the scale determination unit 160. As described above, the virtual information is stored in the storage unit 156 in association with the actual size of each virtual information. The virtual information arrangement unit 162 acquires the virtual information to be arranged in the real-world image and the size of the virtual information from the storage unit 156, and calculates the size of the virtual information in the three-dimensional space based on the scale of the space calculated by the scale determination unit 160 and the information on the size of the virtual information.

For example, in the case the scale of the space is determined to be 10 cm/div by the scale determination unit 160, the size, in the three-dimensional space, of virtual information "cat" whose actual size is 50 cm will be "5 divisions". Accordingly, the virtual information arrangement unit 162 adjusts the virtual information "cat" to 5 divisions, and arranges the same at an appropriate position.

Also, at the time of arranging the virtual information, if the position of the virtual information is already determined by the relative position or the relative distance from the information processing apparatus 10 or the absolute position of a GPS or the like, the virtual information arrangement unit 162 adjusts the virtual information to appropriate dimensions and also arranges the same at an appropriate position based on the scale of the three-dimensional space.

The image generation unit 164 has a function of overlaying, on a real-world image, the virtual information arranged by the virtual information arrangement unit 162, and generating a two-dimensional output image. For example, an output image is generated by overlaying, on a real-world image, an image obtained by projecting, on a two-dimensional plane which is a virtual display, virtual information on the three-dimensional space coordinates. The image generation unit 164 provides the generated image to the image output unit 166.

The image output unit 166 has a function of outputting an image provided by the image generation unit 164 to a display (not shown) or the like. The output device such as the display may be integrated in the information processing apparatus 10 or may be provided in a separate device. The image output unit 166 sends the generated image to the display regardless of whether the display is integrated in or separate from the information processing apparatus 10.

Additionally, in the above, a case where an object to be the scale reference, such as a person, is included in the real-world image has been described, but in the case the object to be the scale reference is not included in the real-world image, a message to the effect that an object to be the scale reference has to be photographed may be displayed on the display and notified to the user.

(5) Details of Operation of Information Processing Apparatus

Figure 7:
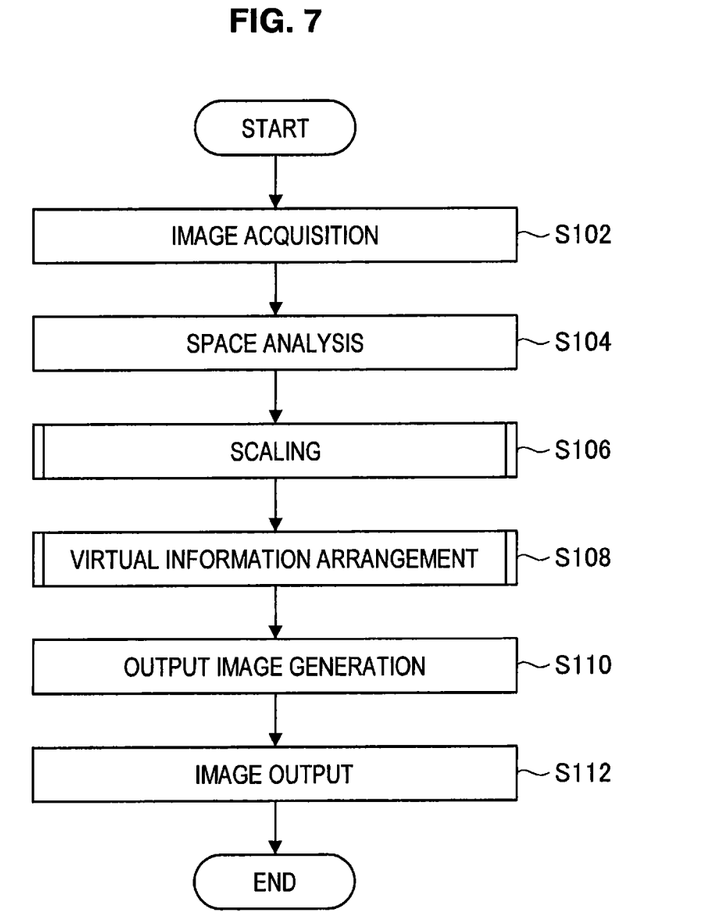
FIG. 7 is a flow chart showing an overall operation of the information processing apparatus according to the embodiment.

In the foregoing, the functional configuration of the information processing apparatus 10 has been described. Next, details of the operation of the information processing apparatus 10 will be described with reference to FIGS. 7 to 10. FIG. 7 is a flow chart showing an overall operation of the information processing apparatus 10. First, the image acquisition unit 152 acquires an image of the surroundings of the information processing apparatus 10 via an imaging device (S102).

Then, the space analysis unit 154 analyses the structure of the real-world image, as a three-dimensional space, acquired in step S102. As described above, as a method of analyzing the three-dimensional structure based on a real-world image, the three-dimensional structure of the real-world image may be analysed by perceiving the shades of the image, or the three-dimensional structure may be analysed based on the configuration of a frame obtained by detecting a frame of a building or the like included in the real-world image.

Figure 8:
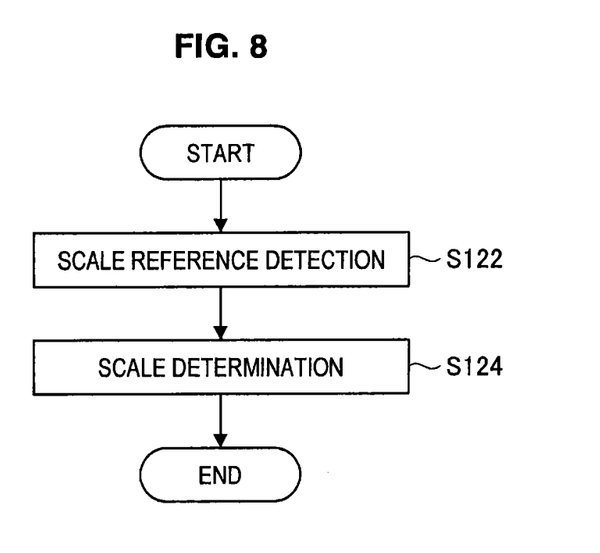
FIG. 8 is a flow chart showing details of a scaling process according to the embodiment.

Next, scaling of the real-world image is performed by the scale reference detection unit 158 and the scale determination unit 160 (S106). Here, the scaling process of step S106 will be described in detail with reference to FIG. 8. FIG. 8 is a flow chart showing details of the scaling process.

As shown in FIG. 8, the scale reference detection unit 158 selects an object to be the scale reference, and detects the length of the object (S122). The scale reference detection unit 158 selects in step S122 an object such as a person or a face included in the real-world image, whose average length is apparent, and detects the number of divisions or the like of the object on the three-dimensional space coordinate system.

Then, the scale determination unit 160 determines the scale of the three-dimensional space from the length of the object detected in step S122 (S124). It is assumed that the object to be the scale reference in step S122 is a person, and that its length is detected to be 16.5 divisions. In the case it is set in advance that the average height of people is 165 cm, the scale of the space is determined in step S124 to be 10 cm/div.

Figure 9:
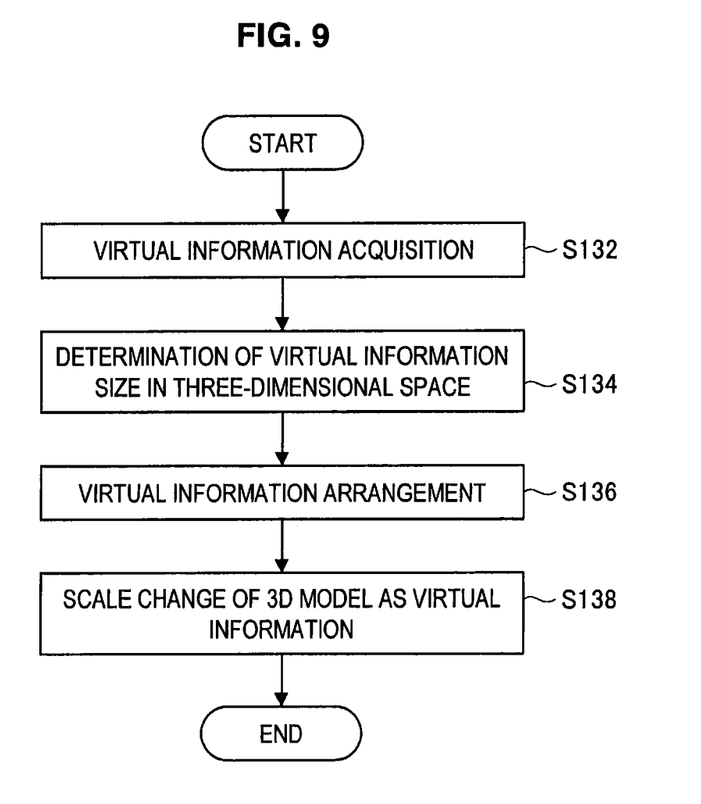
FIG. 9 is a flow chart showing details of a virtual information arrangement process according to the embodiment.

In the foregoing, the details of the scaling process of step S106 have been described. Returning to FIG. 7, the explanation will be continued. After the scaling process is performed in step S106, virtual information is arranged on the real-world image by the virtual information arrangement unit 162 (S108). Here, details of a virtual information arrangement process of step S108 will be described with reference to FIG. 9. FIG. 9 is a flow chart showing details of the virtual information arrangement process.

As shown in FIG. 9, the virtual information arrangement unit 162 first acquires the virtual information stored in the storage unit 156 (S132). Then, based on the space scale determined in step S106, the size of the virtual information in the real-world image is determined (S134). In step S134, in the case the scale of the space is determined to be 10 cm/div in step S106, for example, the size, in the three-dimensional space, of virtual information "cat" whose actual size is 50 cm is determined to be "5 divisions".

Then, the virtual information acquired in step S132 is arranged on the three-dimensional space coordinates (S136), and the size of the 3D model as virtual information is changed to the size determined in step S134 (S138). Additionally, arrangement of the virtual information in step S136 may be performed immediately after step S132.

Figure 10:
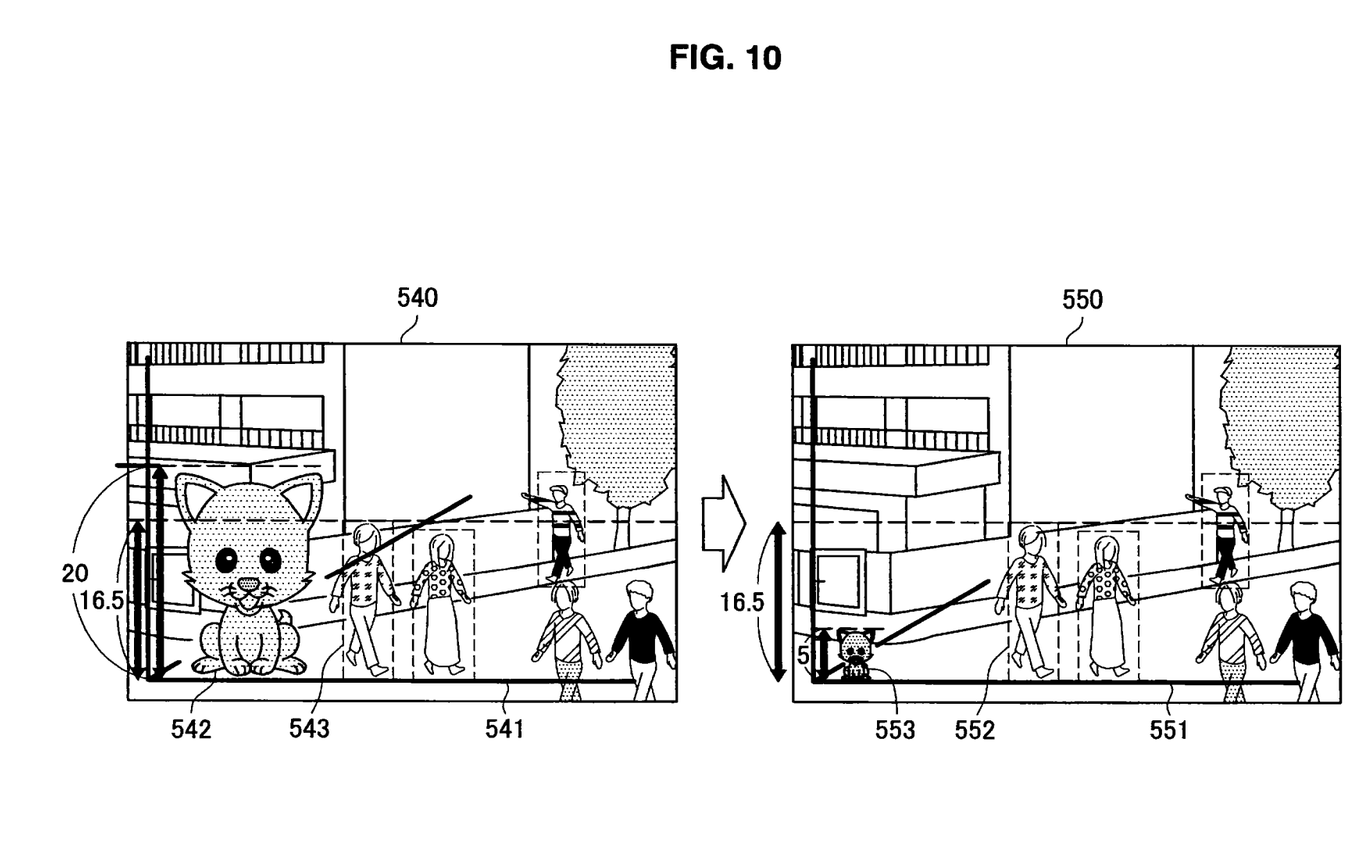
FIG. 10 is an explanatory diagram describing an example arrangement of virtual information according to the embodiment.

Here, an example arrangement of the virtual information will be described with reference to FIG. 10. FIG. 10 is an explanatory diagram describing an example arrangement of the virtual information. As shown in FIG. 10, in relation to an image 540, the structure of the three-dimensional space is analysed by the space analysis unit 154 and a coordinate axis 541 is set. A plurality of persons are included in the image 540, and the length of a person 543 is detected by the scale reference detection unit 158 and the division for the person is 16.5 divisions, and it is assumed that the height in the real world is 165 cm. The scale determination unit 160 determines the scale of the three-dimensional space to be 10 cm/div.

In the image 540, the virtual information "cat" is overlaid on the real-world image without its size being changed according to the scale. Accordingly, in the image 540, the size of the cat is 20 divisions, and it is a state where the dimensions of people and the cat are not in accordance with the actual dimensions.

An image 550 is an output image which is a result of changing the scale of the virtual information by the virtual information arrangement unit 162. In the image 550, since the actual size of the virtual information "cat" is 50 cm, change is made from 20 divisions to 5 divisions according to the scale (10 cm/div) of the three-dimensional space coordinates. Accordingly, in the image 550, the dimensions of virtual information "cat" 553 are appropriate with respect to the dimensions of a person 552. In the foregoing, the details of the virtual information arrangement process have been described.

Returning to FIG. 7, the explanation will be continued. After the virtual information has been arranged in step S108, the image generation unit 164 generates an output image (S110). In step S110, the virtual information whose scale has been changed in step S108 is overlaid on the real-world image, and a two-dimensional output image is generated. Then, the image output unit 166 outputs the image generated in step S164 to the display (S112).

In the foregoing, the details of the operation of the information processing apparatus 10 have been described. Each process shown in FIG. 7 may be periodically performed in accordance with the frame rate of the imaging device or the like. Also, the space analysis step (S104), the scaling step (S106), and the virtual information arrangement step (S108) are steps that create a heavy processing load, and thus it is possible to have them performed once every several cycles. Also, the scaling step (S106) may be performed only once at the beginning, and does not have to be performed periodically.

Furthermore, in the present embodiment, a unified scaling process is performed for one real-world image, but the present invention is not limited to such an example. That is, scaling may be changed, in one real-world image, for each of a plurality of spaces. For example, different space scales may be determined for places near and far from the information processing apparatus 10. This causes the virtual information arranged near the information processing apparatus 10 to be arranged being changed to a larger size than the virtual information arranged far from the information processing apparatus 10, and the virtual information can be arranged similarly to the actual three-dimensional space.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, the steps of the processing of the information processing apparatus 10 of the present specification do not necessarily have to be processed chronologically according to the order described as the flow chart. That is, the steps of the processing of the information processing apparatus 10 may be different processes or they may be processed in parallel.

Furthermore, a computer program for causing hardware, such as a CPU, a ROM, a RAM, or the like, installed in the information processing apparatus 10 or the like to realize the same function as each component of the above-described information processing apparatus 10 can also be created. Furthermore, a storage medium storing the computer program is also provided.

Figure 11:
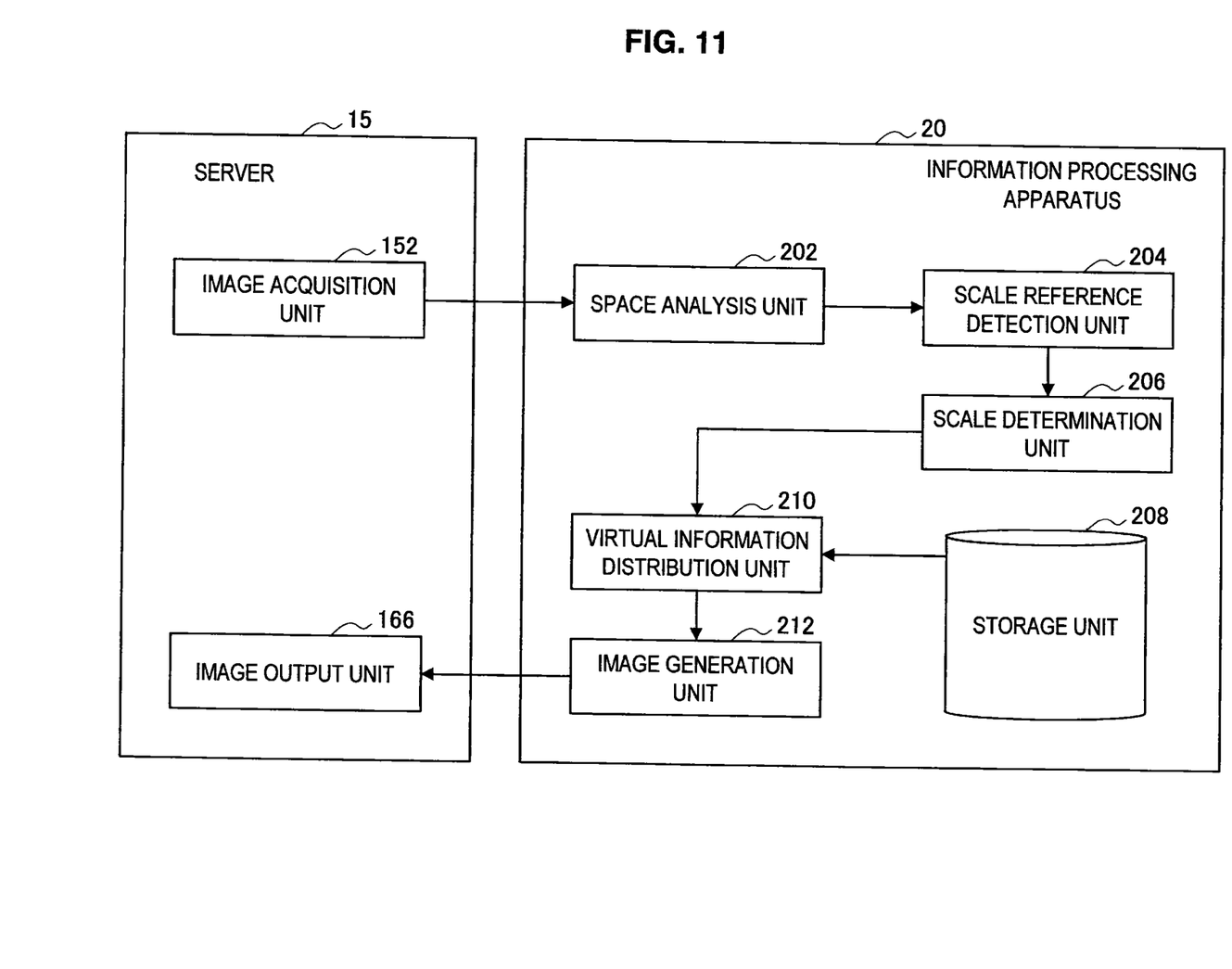
FIG. 11 is a block diagram showing functional configurations of an information processing apparatus and a server according to another embodiment.

According to the embodiment described above, each process is performed in the information processing apparatus 10, but the present invention is not limited to such an example. For example, a predetermined process of the information processing apparatus 10 may be performed by a server 20 connected to a network. FIG. 11 is a block diagram showing the functional configurations of the information processing apparatus 10 and the server 20.

As shown in FIG. 11, the information processing apparatus 15 and the server 20 are connected via a network. The information processing apparatus 15 includes an image acquisition unit 152 and an image output unit 166. Also, the server 20 includes a space analysis unit 202, a scale reference detection unit 204, a scale determination unit 206, a storage unit 208, a virtual information arrangement unit 210, an image generation unit 212, and the like.

Each unit of the server 20 has an equivalent function as each unit corresponding to the information processing apparatus 10 described above, and a detailed explanation will be omitted. With the configuration shown in FIG. 11, a process that creates a heavy load, such as the space analysis process, the scale determination process, the image generation process, or the like, will be performed by the server 20. That is, the real-world image acquired by the information processing apparatus 15 is transmitted to the server 20 via the network. Then, the space analysis unit 202 of the server 20 uses the real-world image which has been transmitted, and analyses the three-dimensional space structure of the real-world image. Furthermore, the length, in the three-dimensional space, of the object to be the scale reference is detected by the scale reference detection unit 204, and the scale of the three-dimensional space is determined by the scale determination unit 206. Then, the size of the virtual information is adjusted by the virtual information arrangement unit 210 to a size according to the scale, and an output image obtained by overlaying the virtual information is generated by the image generation unit 212. The image generated by the image generation unit 212 is transmitted to the information processing apparatus 15, and is displayed on the display of the information processing apparatus 15.

This enables to acquire, simply by transmitting the real-world image to the server 20, a desired image whose virtual information has been changed to appropriate dimensions, even in a case the processing performance of the information processing apparatus 15 is not good and performing a process that creates a heavy load will take time.

REFERENCE SIGNS LIST

10 Information processing apparatus
152 Image acquisition unit
154 Space analysis unit
156 Storage unit
158 Scale reference detection unit
160 Scale determination unit
162 Virtual information arrangement unit
164 Image generation unit
166 Image output unit
15 Information processing apparatus
20 Server
202 Space analysis unit
204 Scale reference detection unit
206 Scale determination unit
208 Storage unit
210 Virtual information arrangement unit
212 Image generation unit

The invention claimed is:
1. An information processing apparatus comprising:
circuitry configured to
acquire a real-world image;
analyzing analyze a three-dimensional space structure of the real-world image;
detect a length, in a three-dimensional space, of an object included in the real-world image to be a scale reference;
determine, from the detected length of the object, a scale of the three-dimensional space;
store virtual information to be displayed by being overlaid on the real-world image and a real size of the virtual information in association with each other;
adjust a size of the virtual information according to the determined scale of the three-dimensional space of the real-world image; and
generate an output image including the object and the virtual information whose size has been adjusted overlaid on the real-world image, the object being at least partially visible in the output image.

2. The information processing apparatus according to claim 1,
wherein the object to be a scale reference is a person.

3. The information processing apparatus according to claim 1,
wherein the object to be a scale reference is a face.

4. The information processing apparatus according to claim 1,
wherein the circuitry preferentially takes an object that is clearly captured, among objects included in the real-world image, as the object to be a scale reference.

5. The information processing apparatus according to claim 1,
wherein the circuitry preferentially takes an object that is located at a distance near an imaging device, among objects included in the real-world image, as the object to be a scale reference.

6. The information processing apparatus according to claim 1,
wherein the circuitry preferentially takes an object near a horizontal position of an imaging device, among objects included in the real-world image, as the object to be a scale reference.

7. An information processing method comprising:
acquiring a real-world image;
analyzing a three-dimensional space structure of the real-world image;
detecting a length, in a three-dimensional space, of an object included in the real-world image to be a scale reference;
determining, from the detected length of the object, a scale of the three-dimensional space;
storing virtual information to be displayed by being overlaid on the real-world image and a real size of the virtual information in association with each other;
adjusting a size of the virtual information according to the determined scale of the three-dimensional space of the real-world image; and
generating, by a circuitry, an output image including the object and the virtual information whose size has been adjusted overlaid on the real-world image, the object being at least partially visible in the output image.

8. A non-transitory computer-readable storage medium storing computer-readable instructions thereon, which, when executed by a computer, cause the computer to perform a method comprising:
acquiring a real-world image;
analyzing a three-dimensional space structure of the real-world image;
detecting a length, in a three-dimensional space, of an object included in the real-world image to be a scale reference;
determining, from the length of the object detected by the scale reference detection unit, a scale of the three-dimensional space;
storing virtual information to be displayed by being overlaid on the real-world image and a real size of the virtual information in association with each other;
adjusting a size of the virtual information according to the determined scale of the three-dimensional space of the real-world image; and
generating an output image including the object and the virtual information whose size has been adjusted overlaid on the real-world image, the object being at least partially visible in the output image.

9. The information processing apparatus according to claim 1, wherein the circuitry is further configured to divide the real-world image into plural sections and determine a respective scale for a three-dimensional space of each of the sections.

10. The information processing method according to claim 7, further comprising dividing the real-world image into plural sections and determining a respective scale for a three-dimensional space of each of the sections.

11. The non-transitory computer-readable storage medium according to claim 8, further comprising dividing the real-world image into plural sections and determining a respective scale for a three-dimensional space of each of the sections.

* * * * *